May 17, 1960  W. H. NEELY  2,936,824
WIRE SPRING SEAT CONSTRUCTION
Filed May 23, 1958  3 Sheets-Sheet 1
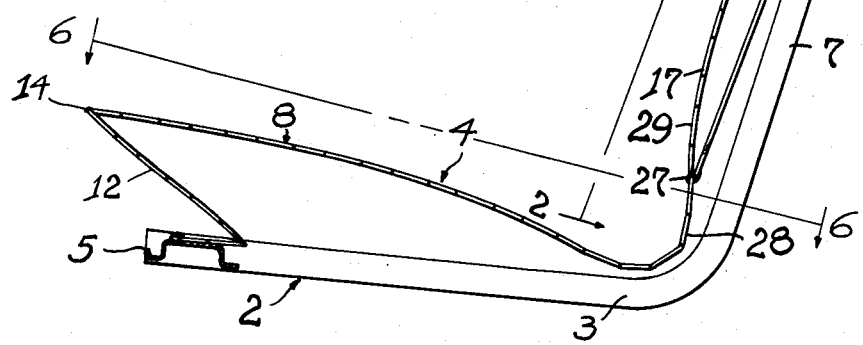
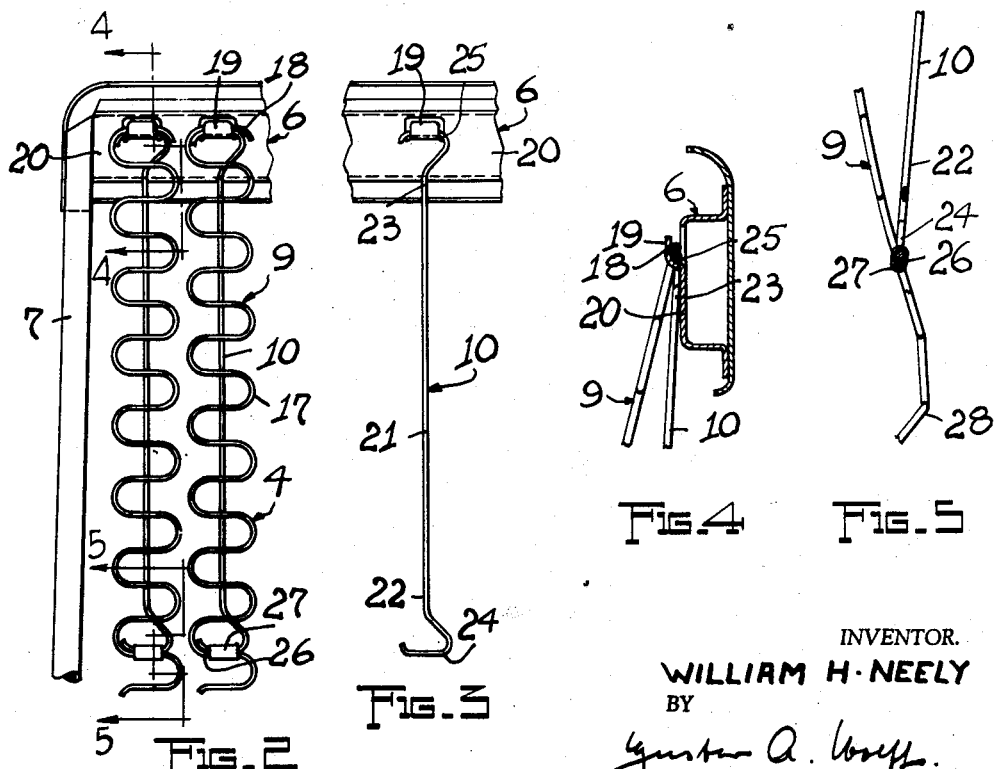
INVENTOR.
WILLIAM H. NEELY
BY
ATT.

May 17, 1960 W. H. NEELY 2,936,824
WIRE SPRING SEAT CONSTRUCTION
Filed May 23, 1958 3 Sheets-Sheet 2
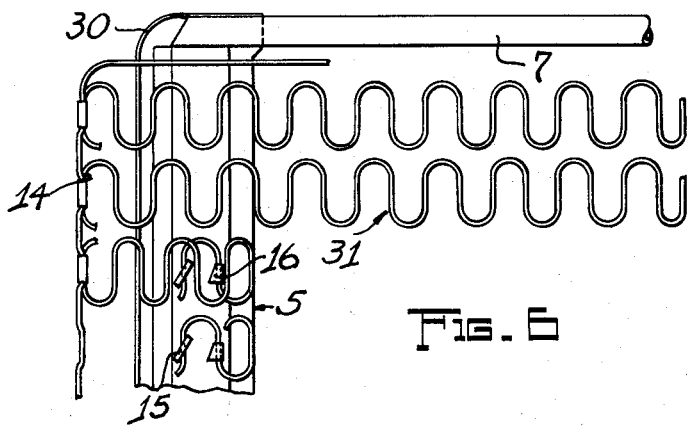
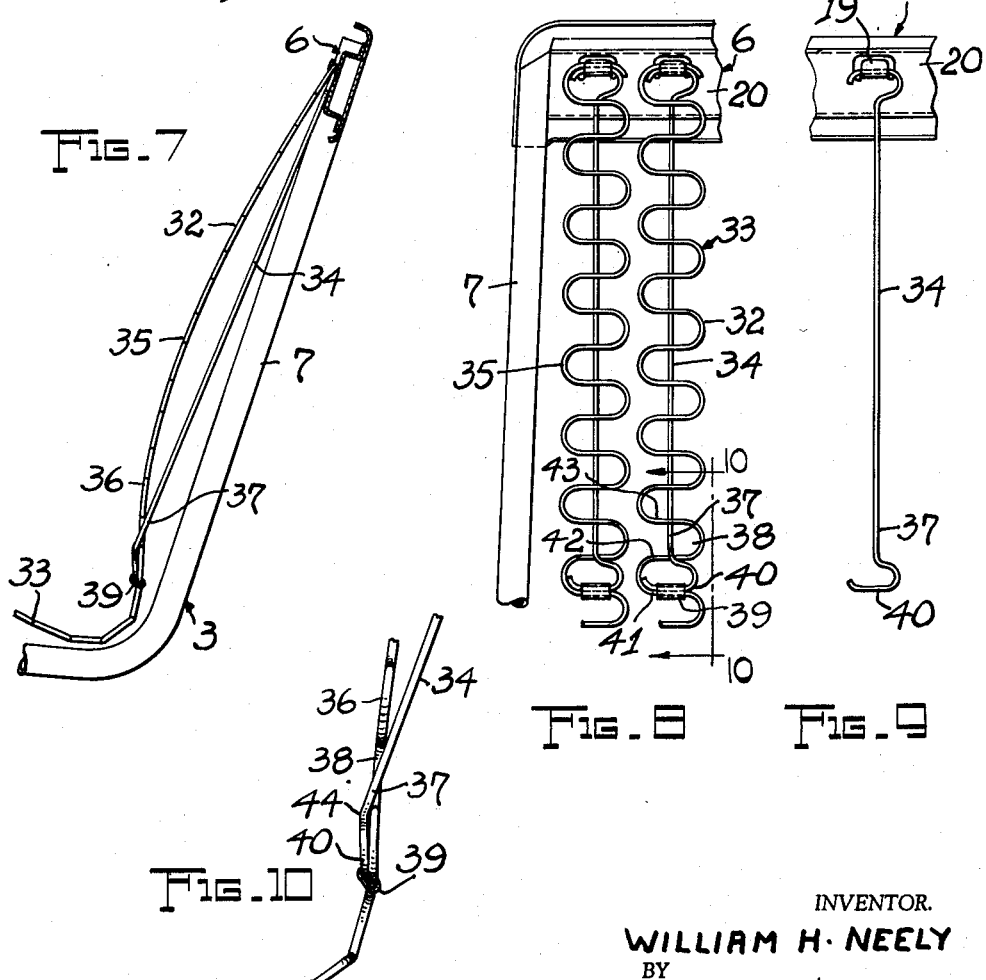
INVENTOR.
WILLIAM H. NEELY
BY
ATT.

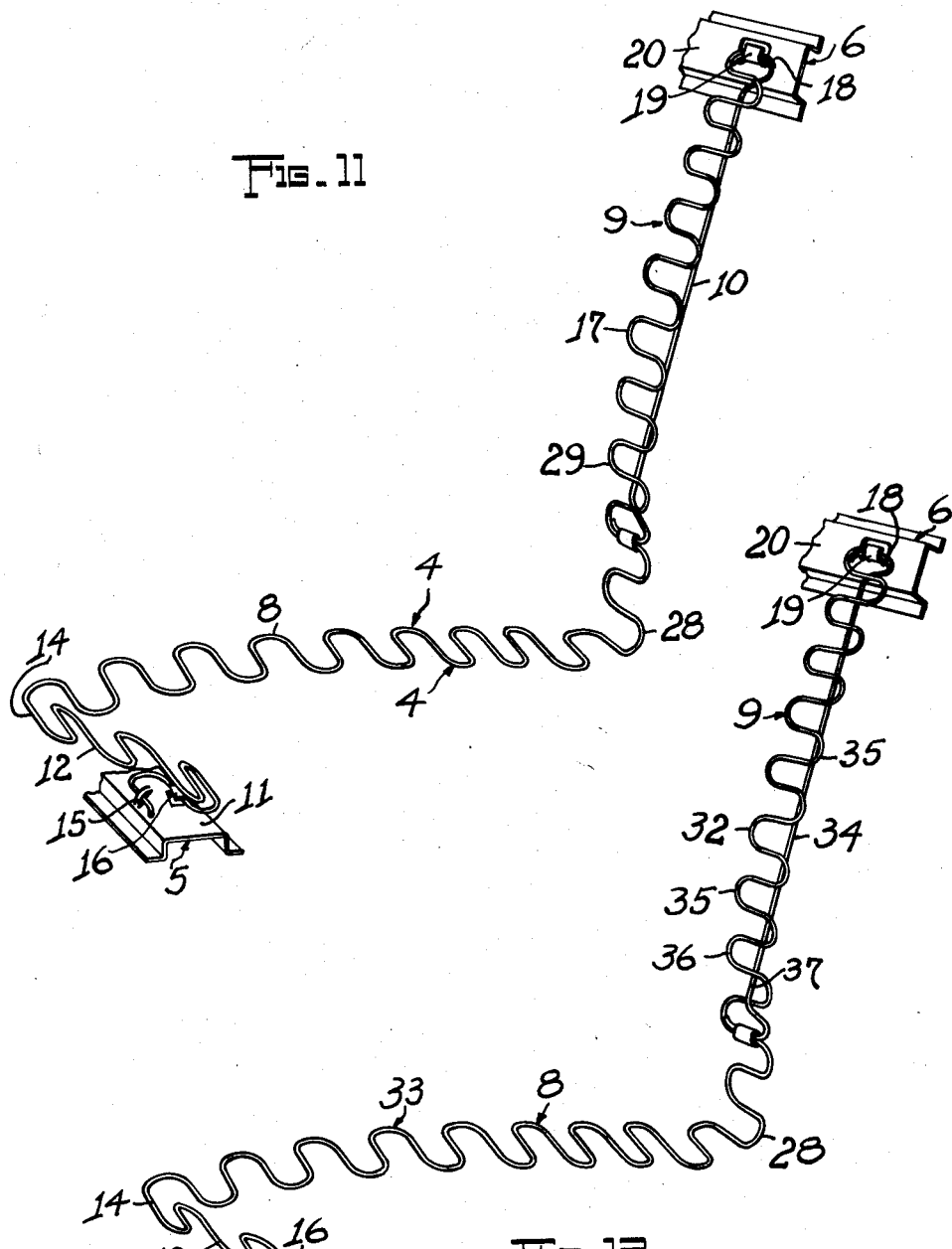

United States Patent Office 2,936,824
Patented May 17, 1960

2,936,824
WIRE SPRING SEAT CONSTRUCTION

William H. Neely, Cleveland, Ohio, assignor to Universal Incorporated, a corporation of Ohio Application May 23, 1958, Serial No. 737,342

5 Claims. (Cl. 155—179)

This invention relates in general to sinuously corrugated wire spring elements and, more particularly, to improved sinuously corrugated wire spring elements for upholstered wire spring seating constructions.

Styling appearance has now become a factor of ruling importance in the automotive industry. As automobiles have been restyled lower and lower, and as engineers have developed more mechanical variations affecting frame and body shape, the seating problem has become increasingly difficult. As the roofs of cars are lowered, as the transmissions are moved adjacent the rear axles, and as new air chassis suspensions and other mechanical innovations are adopted by the automotive industry for advanced performance purposes, less space is available for seating the passengers with adequate comfort through the mere use of prior known seat structures, such as zigzag spring units of the type typically disclosed in my Patent No. 2,280,480.

The lowering of car roofs by automotive stylists, and the increasing use by vehicle engineers of sharply angled ramps, large tunnels, and other irregular configurations extending upwardly into the floor pans to accommodate novel transmissions, suspensions and the like, has resulted in extreme reductions in the available inside space for static seating with little or no "extra" space for adsorbing shock loading.

In order to achieve comfortable static seating within an automobile there should be sufficient inside space available to permit the spring surfaces and the supporting padding and upholstery to deflect for load support. There must be a minimum necessary spring deflection space for adequate total cushion and back penetration, under seating load pressures low enough to maintain reasonable body comfort, and at the same time there must also be still further free deflection space available to absorb shock load penetrations. It should be recognized, therefore, that any new concept in automobile seating must provide adequate seating comfort under both static and shock load conditions with relatively thin cushion and back structures; must provide rear seat foot room despite floor pan conformation and obstruction; and must achieve full shock load absorption and continuous dampening within a minimum available space.

It is the primary purpose fo this invention, therefore, to provide novel sinuously corrugated wire spring units, of the type having integrally unitary seat and back rest portions, wherein the units are particularly constructed so as to provide flexible seat and back rest foundations adapted to fulfill the demands of upholstered seating constructions for modern automobile styling, and characterized by substantially full load supporting contact of the seat and back rest portions, wide area distribution of the loading forces, and decreased normal load and shock load deflections.

The general object of the invention is the provision of a preformed wire spring unit of zigzag-shaped wire embodying a yielding, elongated seat portion and a yielding, elongated back rest portion connected to each other by means of an integrally unitary curved sweep, and wherein the wire spring unit includes: a rearwardly and downwardly extended supporting means at the front end of the seating portion thereof, permitting yielding mounting of the wire spring unit in forwardly elevated position on a relatively fixed support; attaching means near the top of the back rest portion thereof, permitting suspension of the wire spring unit from another relatively fixed support arranged in vertically and laterally offset relation with respect to the first support; and a straight wire connection of substantially shorter length than the back rest portion and connecting opposite end portions thereof, thereby preventing axial extension of the back rest portion while permitting shaping thereof to the contour of loads placed thereagainst.

Wire spring units supported in the aforesaid novel manner of the present invention attain both fore-and-aft and vertical stability by the forwardly overhanging, elevated mounting of their seat portions and by the suspension of their longitudinally non-extensible back rest portions. Furthermore, proper seating is achieved under substantially all load conditions because of the direct cooperation of the seat and back rest portions in response to force loads upon either or both, a cooperation which is "controlled" by the particular shapes of the seat and back rest portions, respectively, and by the particularly coordinated shape of the connecting area therebetween.

Another object of the invention, therefore, is the provision of a preformed wire spring unit of zigzag-shaped wire including a longitudinally extensible, flexible seat portion having a rearwardly and upwardly curved sweep at the rear end thereof; a flexible back rest portion extended upwardly from the curved sweep of the seat portion and including a straight wire member shorter than the back rest portion and connected to opposite ends thereof for providing the back rest portion with a forward curvature and for preventing its longitudinal extension; a rearwardly and downwardly extending supporting means permitting yielding, flexible mounting of the wire spring unit at the front end of its seat portion in forwardly overhanging, elevated position on a relatively fixed support for fore-and-aft stability; and attaching means near the top of the longitudinally non-extensible back rest portion permitting suspension of the wire spring unit from a relatively fixed support for vertical stability.

A wire spring unit of the novel type described, supported in the aforesaid manner, effects a hugging support of an occupant's back under both normal and shock loads and, particularly, effects increased hugging engagement and support of the lower part or "small" of an occupant's back by means of a pronounced forward "bow" which is preformed in the lower part of the back rest portion and is extended opposite the corresponding inward curvature or "hollow" of an occupant's back. This hugging support is readily controlled by predetermined rearward offsetting of the curved sweep of the wire spring unit, so as to avoid excessive hugging of the wire sweep under normal load and to increase such hugging under shock load.

A further object of the invention, therefore, is the provision of a preformed wire spring unit of zigzag-shaped wire of the type described having seat, back rest, and interconnecting curved sweep portions, wherein the back rest portion includes in the lower part thereof a pronounced forwardly extended bowed area arranged to extend substantially opposite the hollow of an occupant's back, and arranged to be partly "controlled" by the longitudinal extension-limiting action of a length of the straight connecting wire extending between the opposite ends of the backrest portion and wherein the curved sweep is rearwardly offset so as to decrease at normal loads and increase at shock loads the forward hugging action thereof to effect under all load conditions proper full contacting support of an occupant's load shape.

Still another object of the invention is the provision of a preformed wire spring unit of zigzag-shaped wire, which wire spring unit is of substantially L-shaped form including a horizontally arranged, longitudinally extensible, and upwardly curved seat portion; a vertically arranged, forwardly curved back rest portion, having a straight wire connection between its opposite ends to prevent longitudinal extension thereof; a rearwardly curved connecting area between the longitudinally extensible seat portion and the longitudinally nonextensible back rest portion, extending in rearwardly offset relation with respect to the longitudinally non-extensible back rest portion and merging on a "sweeping" line of curvature into the seat and back rest portions; and supporting and suspension means at the front end of the seat portion and at the top end of the back rest portion.

Still another object of the invention is the provision of a plurality of preformed wire spring units of zigzag-shaped wire, mounted side by side on frame means to provide a seating construction, wherein each spring unit is of substantially L-shaped form having a substantially horizontally arranged, longitudinally extensible, upwardly curved seat portion, including at its front end downwardly and rearwardly inclined supporting means and including at its rear end a rearwardly and upwardly extended curved sweep; and having a substantially vertically arranged, forwardly curved back rest portion, including between the opposite ends thereof a straight wire connection preventing its longitudinal extension, including at the top end thereof attachment means, and including near the lower end thereof a forwardly extended bow arranged to extend opposite the hollow of the back of an occupant of the seating construction, the bow being forwardly extended with respect to the curved sweep of the seat portion and merged thereinto.

A still further object of the invention is the provision of a preformed wire spring unit of the type described, wherein the straight connecting wire between opposite ends of the back rest portion differentiates in cross section from the zigzag-shaped wire of the wire spring unit to control elastic reaction of the seat and the connecting sweep of the wire spring unit.

Still another object of the invention is the provision of a preformed wire spring unit of zigzag-shaped wire of the type described above, wherein the straight connecting wire between opposite ends of the back rest is connected thereto in cantilever-like fashion.

With the above and other objects in view, the invention has certain other marked superiorities which clearly distinguish it from presently known structures and arrangements of this type. These improvements or characteristics embodying certain novel features of construction and design are clearly set forth in the appended claims and the embodiments of the invention hereinafter shown with reference to the accompanying drawings forming part of the specification.

In the drawings:

Figure 1 is a vertical cross sectional view through a wire spring seating construction assembled from a plurality of wire spring units arranged side-by-side and each embodying the novel principles and features of the invention.

Figure 2 is a fragmentary front view of the wire spring construction shown in Figure 1, taken substantially as indicated by the line 2—2 of Figure 1.

Figure 3 is a front view similar to Figure 2, showing the straight connecting wire of a single wire spring unit, the zigzag-shaped wire portion thereof being deleted.

Figure 4 is a cross sectional view taken substantially as indicated by the line 4—4 of Figure 2.

Figure 5 is a cross sectional view taken substantially as indicated by the line 5—5 of Figure 2.

Figure 6 is a fragmentary top view of the wire spring seating construction shown in Figure 1 taken substantially as indicated by the line 6—6 of Figure 1.

Figure 7 is a fragmentary vertical cross sectional view through a wire spring seating construction assembled from a plurality of wire spring units arranged side-by-side and each modified with respect to the wire spring units shown in Figure 1.

Figure 8 is a fragmentary front view of the wire spring construction shown in Figure 7.

Figure 9 is a front view similar to Figure 8, showing the straight connecting wire of a single wire spring unit, the zigzag-shaped wire portion thereof being deleted.

Figure 10 is a fragmentary side elevational view taken substantially as indicated by the line 10—10 of Figure 8.

Figure 11 is a perspective view of one of the wire spring units of the seating construction of Figures 1 to 6, shown as attached to fragmentary portions of the top and bottom rails of the frame thereof.

Figure 12 is another perspective view, similar to Figure 11, showing the modified form of wire spring units of Figures 7 to 10.

Referring now more particularly to Figures 1 to 6 and 11 of the drawing, a wire spring seating construction embodying the present invention is designated generally by the reference numeral 2, and comprises an open frame or supporting means 3 of L-shaped form mounting a plurality of wire spring units 4 in transverse side-by-side relation. The frame 3 includes a spaced pair of generally parallel channel-shaped rails, including a stationary, horizontally arranged lower rail 5, and a stationary, horizontally arranged upper rail 6 secured to the lower rail 5 by means of a pair of tubular side arms 7 of L-shaped form. The frame 3 provides a relatively fixed supporting means for suspending a plurality of wire spring units 4 from the lower and upper rails 5 and 6 in substantially parallel and side-by-side relation crosswise of the frame. Each of the wire spring units 4 embodies a zigzag-shaped, longitudinally extensible seat portion 8, and a zigzag-shaped, longitudinally non-extensible back rest portion 9 integrally extending from and cooperating with the seat portion 8. The back rest portion 9, which is forwardly curved to provide rearward yieldability in response to the load forces of an occupant's body, is prevented from effecting any longitudinal extension in response to load forces by means of a straight wire member 10 connected to spaced points substantially at the opposite ends thereof.

Each longitudinally extensible wire seat portion 8 of the plurality of wire spring units 4 is mounted on a web portion 11 of the channel-shaped lower rail 5 by means of a yieldable lever arm 12 extending rearwardly and downwardly from the front end 14 of the seat portion 8, the lever arm 12 is attached to the web 11 by a flat loop 15 projected upwardly from the web (see Figure 6), and by a hook-shaped portion 16 struck up from the web 11, to effect a substantially cantilever-like connection of the lever arm 12 with the web 11. The fixed connection of the lower and rearward end of the lever arm 12 to the rail 5, and the yieldability of the lever arm 12 in response to seating loads enables an arcuate forward movement of the front end 14 of the wire seat portion 8 to various positions of balanced response to the normal or static seating load and to shock loads, whereby an effective fore-and-aft stability is achieved for the wire spring units 4.

The longitudinally non-extensible wire back rest portion 9 includes a zigzag-shaped wire body 17 which has its end coil formed with an inwardly curved bend 18, which is hooked over a struck-up tongue 19 of a web portion 20 of the upper channel-shaped rail 6, for suspension of the zigzag-shaped wire body 17 from the frame 3. The straight wire member 10, connecting the opposite ends of the zigzag-shaped wire body 17 to predetermine the extent of forward curvature thereof and to limit its longitudinal extensibility, comprises an elongated straight wire portion 21 formed at its opposite ends 22, 23 with hook-like portions 24, 25. The lower end 22 is connected to a cross portion 26 of one of the zigzag loops of the body 17 by means of a clip 27, and the upper end 23 is hooked over the tongue 19 in the web 20 of upper rail 6. It will be understood that the upper end 23 alternatively may be directly secured to a suitable wire cross member (not shown) at the upper end of the zigzag-shaped body 17, if so desired.

The elongated seat portion 8 and the elongated back rest portion 9 of each wire spring unit 4 are integrally connected with each other as a single unitary structure by a rearwardly and upwardly extended sweep 28 of substantial arcuate length at the rear end of the seat portion 8, merging or blending with the back rest portion 9. Bending or opening movement of the wire spring unit 4 at the zone of interconnection formed by the sweep 28 is distributed over a substantial length of arc, thereby contributing to a movement of the seat spring construction toward effective hugging support of the body load in full conformity with the body load shape.

The wire spring unit 4, with its rearwardly and upwardly curved sweep 28, wraps tightly against an occupant's body only when the wire spring unit is exposed to shock loads and when the shock load "travel" or extent of yielding should be limited. This action is caused by the provision of a pronounced forwardly bowed portion 29 in the lower portion of the forwardly curved wire body 17 of the back rest portion 9. It will be seen that the curved sweep 28 extends upwardly in rearwardly offset relation with respect to the body 17 thereabove. Under normal load the curved sweep 28 effects a relatively gentle yielding response to and conformity with the load shape, and under shock load it effects an immediate and substantial "opening up" of the arc of curvature thereof to more closely conform with the increased load force being impressed by the shape of an occupant's body. This opening up and wrapping against the load shape by the sweep 28, while momentarily increasing hugging contact with an occupant's body, is partly counteracted or limited by the longitudinal extension of the sweep 28 under load, and is so uniform and balanced as not to cause any objectionable or particularly noticeable force effects to be exerted against an occupant.

The wire spring units 4 are connected to each other by a suitable U-shaped edge wire member 30 (see Figure 6), forming the border wire for the seat area of the construction, indicated generally at 31.

A wire spring seating construction of the type herein described is particularly characterized by the mounting of each of its plurality of generally L-shaped wire spring units 4 on a generally L-shaped frame 3 by supporting the front portion of the seat portion 8 in overhanging, cantilever-like fashion upon the horizontal lower rail 5 and by suspending the back rest portion 9 from the horizontal upper rail 6 of the L-shaped frame 3. Such a freely-hanging suspension, wherein the seat area 31 has a yielding front end to insure fore-and-aft and vertical stability of the entire assembly of wire spring units 4, serves to achieve a cooperative load reaction of the collective suspended seat portions 8 and back rest portions 9 for huggingly supporting an occupant by counteractingly responding to substantial areas of the body load shape, including particularly the hollow part of the back of the occupant, while eliminating excessive localized stresses in the wire spring units 4 under normal and shock loads.

Figures 7 through 10 and 12 disclose a second embodiment of the invention, wherein a somewhat modified form of a back rest portion 32 is utilized for a wire spring unit 33. Additional structural elements which are identical with the previously described first embodiment have been designated by the same reference numerals. The back rest portion 32 is generally constructed in a manner similar to the back rest portion 9 shown in Figures 1 through 6 and 11, but the straight connecting wire 34 is attached in cantilever-like fashion to the lower end of a zigzag-shaped wire body 35 of the back rest portion 32. This manner of attachment serves to properly locate a forwardly bowed portion 36 of the back rest portion 32 in rearwardly offset relation with respect to the body portion thereabove, and opposite the hollow part of the back of an occupant, and thereby increases by controlled "bulging" the contact area of the body with the back of an occupant. The cantilever-like attachment of the lower end portion 37 of the straight wire 34 to the zigzag-shaped wire body 35 is effected by extending the end portion 37 through a single loop 38 of the zigzag-shaped wire body 35. A clip 39 serves to attach the hook-shaped terminal end 40 of the end portion 37 to a suitable wire cross member portion 41, which is spaced from the loop 38 to insure proper contact of the end portion 37 with the opposite sides of two adjacent wire cross member portions 42, 43 of the wire body 35. This contacting engagement is additionally insured by means of a forward bend in the end portion 37 at 44 (see Figure 10).

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a seat spring construction, the combination of vertically spaced, laterally offset lower and upper supporting means and a generally L-shaped wire spring unit formed of L-shaped zigzag wire and a straight wire member, said L-shaped zigzag wire having an elongated, longitudinally extensible, substantially horizontal body portion forming a seat and an elongated, substantially vertical body portion extending upwardly therefrom, said straight wire member being attached to the vertical body portion near its top and bottom ends and generally spaced therefrom between said top and bottom ends to provide a longitudinally non-extensible back rest adapted to conform to the contour of a load placed thereagainst, and means at opposite ends of the wire spring unit supporting the front end of the longitudinally extensible seat portion on said lower supporting means and suspending the longitudinally non-extensible back rest portion from said upper supporting means.

2. In a seat spring construction, the combination of vertically spaced, laterally offset lower and upper supporting means and an L-shaped wire spring unit formed of L-shaped zigzag wire and a straight wire member, said L-shaped zigzag wire having an elongated, longitudinally extensible, substantially horizontal body portion forming a seat and an elongated, substantially vertical body portion extending upwardly therefrom, the rear end of said substantially horizontal body portion defining a curved sweep extending upwardly in rearwardly offset relation with respect to said substantially vertical body portion and merged continuity therewith, said straight wire member being attached to the vertical body portion near its upper and lower ends and generally spaced therefrom between said upper and lower ends to provide a longitudinally non-extensible back rest adapted to conform to the contour of a load placed thereagainst, and means at opposite ends of the wire spring unit supporting the front end of the longitudinally extensible seat portion on said lower supporting means and suspending the longitudinally non-extensible back rest portion from said upper supporting means.

3. A seat spring construction as described in claim 1, wherein the lower end of the straight wire member is connected in cantilever-like fashion to the vertical body portion near its lower end, and wherein the upper end of said straight wire member is hingedly suspended from the upper supporting means.

4. A seat spring construction as described in claim 2, wherein the straight wire member is substantially shorter than the length of the vertical body portion between its upper and lower ends, whereby to effect an outward curving of the vertical body portion of the L-shaped zigzag wire.

5. In a seat spring construction, the combination of vertically spaced, laterally offset lower and upper supporting means and a plurality of wire spring units arranged side-by-side and each formed of zigzag wire and a straight wire member, said zigzag wire having an elongated longitudinally extensible, substantially horizontal body portion forming a seat and an elongated, substantially vertical body portion extending upwardly therefrom, said straight wire member being attached to the vertical body portion near its upper and lower ends and being generally spaced therefrom between said upper and lower ends to provide a longitudinally non-extensible back rest, and means at opposite ends of each wire spring unit supporting the front end of the longitudinally extensible seat portion thereof on said lower supporting means and suspending the upper end of the longitudinally non-extensible back rest portion thereof from said upper supporting means, whereby the application of shaped body load forces to the construction effects independent yielding response of each wire spring unit and a collective cooperating interaction of the seat and back rest portions thereof for supporting the body load shape in conformity with the contours thereof.

References Cited in the file of this patent
UNITED STATES PATENTS

| | | |
|---|---|---|
| 2,835,312 | Neely | May 20, 1958 |

FOREIGN PATENTS

| | | |
|---|---|---|
| 635,466 | Great Britain | Apr. 12, 1950 |
| 645,113 | Great Britain | Oct. 25, 1950 |